United States Patent [19]

Stone

[11] Patent Number: 5,059,149
[45] Date of Patent: Oct. 22, 1991

[54] STUFFED ANIMAL WITH BOOK ENCLOSURE APPARATUS

[76] Inventor: Timothy J. Stone, 6960 W. Turquoise, Peoria, Ariz. 85345

[21] Appl. No.: 562,688

[22] Filed: Aug. 6, 1990

[51] Int. Cl.⁵ .............................................. A63H 3/00
[52] U.S. Cl. ........................................ 446/73; 446/72; 446/71; 446/147; 446/302; 446/369
[58] Field of Search ...................... 446/73, 72, 147, 71, 446/302, 369

[56] References Cited

U.S. PATENT DOCUMENTS

| | | | |
|---|---|---|---|
| D. 199,907 | 12/1964 | Journer | 446/73 |
| 1,544,267 | 3/1925 | Munson | 446/73 |
| 4,174,059 | 11/1979 | Maunder | 446/73 |
| 4,197,670 | 4/1980 | Cox | 446/369 |
| 4,372,077 | 2/1983 | Balbuena | 446/73 |
| 4,832,648 | 5/1989 | Theobald | 446/72 |
| 4,874,340 | 10/1989 | Smallwood | 446/369 |

*Primary Examiner*—Robert A. Hafer
*Assistant Examiner*—David J. Kenealy
*Attorney, Agent, or Firm*—H. Gordon Shields

[57] ABSTRACT

Stuffed animal apparatus includes one or more storage compartments in which visual and/or audio materials may be stored and/or displayed. The storage compartments are disposed in the stuffed animal body or in an appendage. An external storage compartment is shown secured to an appendage. The storage compartments may need flap coverings or they may be a pouch and they may be large or small, as desired.

18 Claims, 1 Drawing Sheet

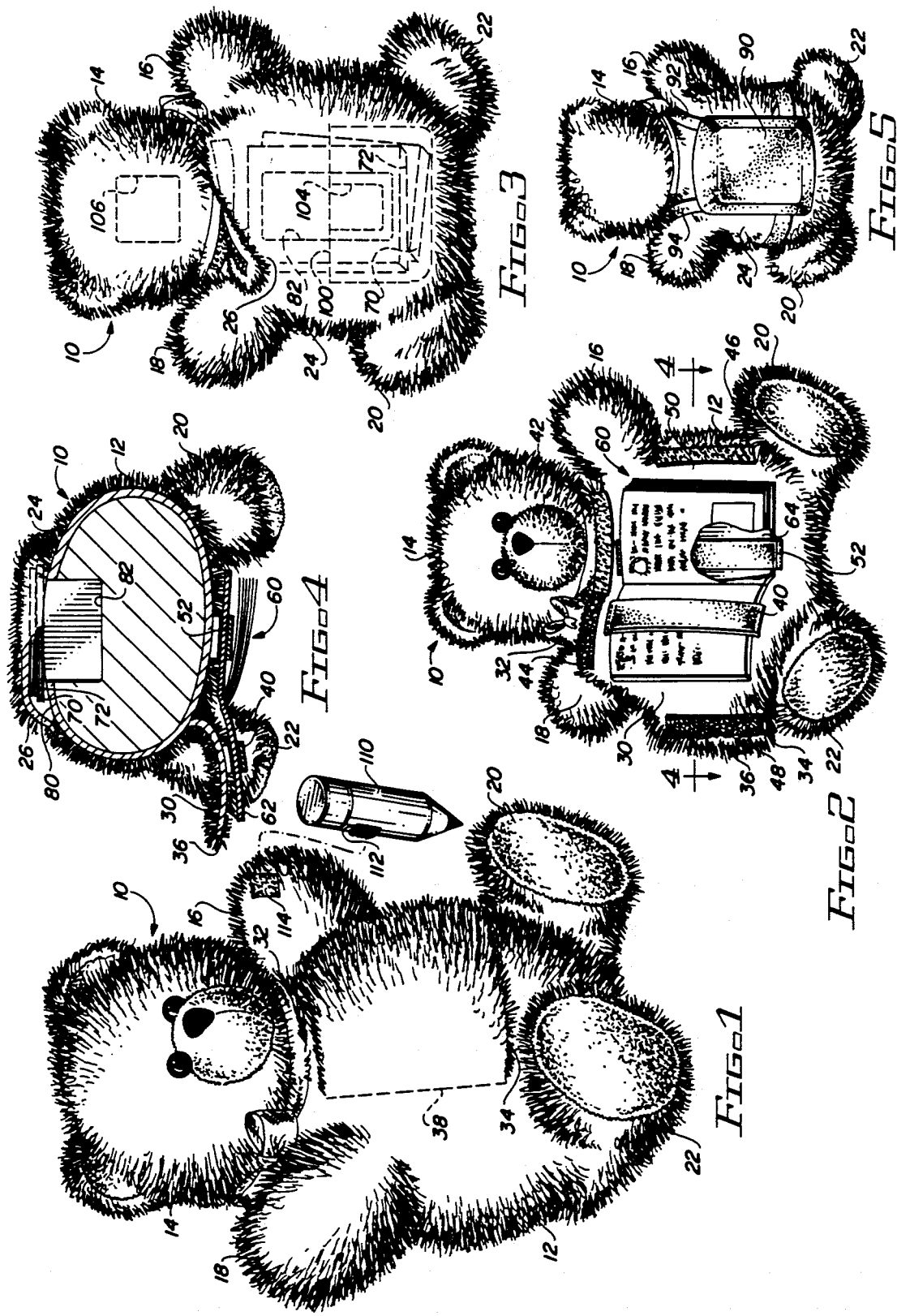

STUFFED ANIMAL WITH BOOK ENCLOSURE APPARATUS

BACKGROUND OF THE INVENTION

1. Field of the Invention

This invention relates to apparatus for holding a book, and, more particularly, to a stuffed animal having a book enclosure for encouraging reading by children.

2. Description of Prior Art

As is well known and understood, young children like stuffed animal toys. There are different types of stuffed animal toys, but they are essentially limited to functioning only as a toy, and not as an educational encouragement entity.

One of the favorite toys of children, both male and female children, is the so called "teddy bear" stuffed animal toy. While there are many different types of stuffed animal toys, the teddy bear appears to be a perennial favorite generation after generation.

The apparatus of the present invention utilizes a stuffed animal toy to encourage reading. The stuffed animal toy includes a book holder compartment beneath a flap at the front or chest area of the animal, and a book is secured to both the body of the animal and the flap.

In the environment shown, a teddy bear is utilized. However, it is obvious that other types of stuffed animals also may be used in generally the same manner. That is, a compartment on the chest portion of the stuffed animal toy and a flap to cover the compartment, with a book being supported by the body of the stuffed animal toy and part of the book being supported by or disposed on the flap.

SUMMARY OF THE INVENTION

Invention described and claimed herein comprises a stuffed animal toy with at least a single compartment for storing and displaying a book. The stuffed animal toy may also include other compartments in which may be disposed additional books, a cassette player, or the like, for encouraging a child to read and to learn.

The stuffed animal toy includes a front flap on the chest area or portion of the animal, and when the flap is opened, a book is exposed. The book is preferably held on both the body or torso of the animal and by the flap so that the book will lay open as a child reads.

Among the object of the present invention are the following:

To provide new and useful stuffed animal apparatus;

To provide new and useful stuffed animal apparatus having a book holding compartment;

To provide new and useful book holder apparatus in the environment of a stuffed animal toy;

To provide new and useful apparatus for holding and displaying a book in the torso of a stuffed animal;

To provide new and useful stuffed animal apparatus having a plurality of compartments for holding and storing a book and other elements; and To provide new and useful stuffed animal apparatus having a plurality of compartments for visual and audio elements.

BRIEF DESCRIPTION OF THE DRAWINGS

FIG. 1 is a perspective view of the apparatus of the present invention.

FIG. 2 is a front view of the apparatus of the present invention is a use configuration.

FIG. 3 is a back view of the apparatus of the present invention.

FIG. 4 is a view in partial section taken generally along line 4—4 of FIG. 2.

FIG. 5 is a back view of the apparatus of the present invention illustrating a alternate element usable with the apparatus of the present invention.

DESCRIPTION OF THE PREFERRED EMBODIMENT

FIG. 1 is a perspective of a stuffed animal apparatus 10 embodying the present invention. The stuffed animal 10, in the representation of a well known teddy bear, is shown in a sitting position. The bear includes a body or torso 12, and five appendages, including a head 14, a pair of "arms" 16 and 18, and a pair of legs 20 and 22.

On the front of the body 12, which is the chest area of the stuffed animal apparatus 10, there is a flap 30. The flap 30 is an integral part of the body 12 at one edge, and is open on three edges. The flap 30 accordingly includes a top free edge 32, a bottom edge 34, and an outer free edge 36.

The flap 30 may be appropriately secured to the body or torso 12 by hook and loop type fastener element pairs. A pair of top edge hook and loop fasteners 42, 44 and a pair of side edge hook and loop fasteners 46, 48 are shown in FIG. 2. The flap 30 pivots on an integral or pivot edge 38, which is essentially a part of the outer covering of the torso 12.

When the flap 30 pivots or opens in its integral or pivot edge 38, a book holding compartment 50 is disclosed. Disposed within the book holding compartment 50 is a book 60 held within the book holding compartment 50 by a strap 52. The book 60 includes a front cover 62, and the cover 62 is secured to the flap 30 by a strap 40. As the pages of the book are turned, as while reading the book, the pages may be slipped under the strap 40 if desired.

When the flap 30 is secured to the torso 12, the compartment 50 is closed and the book 60 is secured within the compartment 50. The pages of the book already read, if the book has not been finished, may conveniently and easily remain beneath the strap 40, if desired, leaving the book "open" to the portion of the book that has not been read when the flap 30 is open, as shown in FIG. 2. Thus, the strap 40 becomes, essentially, a bookmark.

The body 12 includes a back portion 24, and a back flap 26 is secured to the back portion 24 in substantially the same manner as is the flap 30 to the front portion of the body 12. Beneath the flap 26 is another book holding compartment 80. The book holding compartment 80 ia essentially a storage compartment in which may be disposed visual or visually stimulating educational elements, such as a plurality of books, such as a pair of books 70 and 72, coloring books, or paper for drawings, or the like. For example, when the book 60 is read, the book 60 may be placed in the compartment 80, and another book may be removed from the compartment 80 and inserted into the compartment 50 beneath the flap 30 and secured by the straps 40 and 52. Or, if desired, a child may keep coloring books, etc., in the compartment 80 for quick access.

FIG. 5 is a back view of the bear apparatus 10 of FIG. 1, with a backpack 90 shown secured to the back 24 of the bear. The backpack 90 may hold additional books, in addition to the storage compartment 80, or the backpack 90 may be used in place of the storage compartment 80, as desired.

For convenience, the backpack 90 may include a pair of straps 92 and 94 which extend around the arms 16 and 18, respectively. In addition to the straps 92 and 94, or in place thereof, the backpack 90 could also h ⓡsecured to the back 94 of the stuffed animal 10 by a button, snap, or even by hook and loop type fasteners, if desired.

Returning again to FIG. 3, the buck 24 of the stuffed animal 10 is shown. In dotted line are shown three additional elements. In place of the large compartment 80, covered by the flap 26, there could be a pouch 100. The pouch 100 may be defined by an outer covering or flap secured on three sides to the back 24. The pouch 100 comprises a kangaroo-like pouch in which the books 70 and 72 may be kept.

On the inside of the pouch 100 there is illustrated in dotted line a relatively small compartment 104. The compartment 104 is a storage compartment for audio cassettes, and the like As is well known and understood, many children's books include accompanying cassettes. Accordingly, it may be advantages to include a compartment for holding one or more cassettes. Such cassette holding compartment 104 could be on the inside of the pouch 100, on the inside of the flap 26, or it could be a separate compartment within the compartment 80, as desired. That is, the compartment 104 need not be limited to the kangaroo type pouch 100 embodiment.

If an audio cassette is to be utilized with books, such as the books 60, 70, and 72, a compartment holding a cassette player may also be provided in the apparatus 10. In FIGS. 3 and 4, a cassette player compartment 82 is illustrated. The compartment 82 is preferably on the inside of the body 12, or inwardly from the compartment 80, due to the inherent bulkiness of cassette players and to their weight.

The compartment 82 for the cassette player disposed inwardly from the storage compartment 80, may help to provide stability for the animal toy in the use position as shown in the drawing Figures, which is a sitting position. Furthermore, a relatively small compartment, such as the compartment 104, can also could secured directly to the back 24 or it could be inside the compartment 80 and/or adjacent to the compartment 82, as desired.

A relatively small compartment could also be disposed in the head 14, as shown in FIG. A relatively small pouch type compartment 106 is shown in dotted line in FIG. 3. The compartment 106 could receive audio cassettes or similarly relatively small elements.

The stuffed animal apparatus 10 thus comprises an attention setting element that provides audio visual elements for a child to interest a child in primarily reading. However, the animal apparatus 10 may also be used to interest a child in dexterity coordination activities, such drawing, writing, and the like. For such occasion, holder apparatus for pencils, crayons, or the like, may be included, such as illustrated in FIG. 1. In FIG. 1, a relatively large holder 110 is shown in the configuration of a pencil. The holder apparatus 110 includes a fastener element 112 which cooperates with a fastener element 114. The fastener element 114 is preferably secured to the left arm 16 of the animal 10.

In the example of the pencil configured holder apparatus 110, the top or eraser portion may be the cover, with the lower portion, the "pencil" portion comprising the generally cylindrical holder or compartment in which pencils, crayons, and the like may be disposed. In the use of such apparatus 110, drawing paper, or the like, could be disposed either or both within the compartment 50 or the compartment 80, as desired. Thus, in addition to books, the stuffed animal apparatus 10 could also include drawing paper or coloring books, or the like. If a coloring book is provided, the coloring book could be secured as the book 60 is secured, mainly by the straps 40 and 52. The fastener elements 112 and 114 may be hook and loop type fasteners, or any other appropriate cooperating fastening elements.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Stuffed animal apparatus, comprising, in combination;
    body means, including
        a body,
        appendages extending outwardly from the body, and
        a chest area in the body;
    a compartment in the chest area for receiving a book;
    flap means secured to the body and covering the compartment; and
    means for securing the book in the compartment and to the flap means whereby the flap means also comprises a cover for the book.

2. The apparatus of claim 1 in which the flap means includes a flap secured to the body and the means for securing the book to the flap means comprises a first strap secured to the flap, and the means for securing the book in the compartment comprises a second strap.

3. The apparatus of claim 1 in which the flap means includes a flap and means for securing the flap to the body means to cover the compartment.

4. The apparatus of claim 1 in which the body means further includes a back portion and a storage compartment in the back portion for receiving articles to be stored.

5. The apparatus of claim 4 in which the body means further includes a back flap for covering the storage compartment in the back portion.

6. The apparatus of claim 1 in which the body means further includes a back portion and a storage pouch in the back portion.

7. The apparatus of claim 1 in which the body means further includes a back portion and storage means in the back portion spaced apart form the compartment in the chest area.

8. The apparatus of claim 7 in which the storage means includes a pouch.

9. The apparatus of claim 7 in which the storage means include a first storage compartment and a second storage compartment.

10. The apparatus of claim 9 in which the first storage compartment comprises a pouch and the second storage compartment comprises a relatively small compartment for receiving audio cassette elements.

11. The apparatus of claim 9 in which the first storage compartment comprises a relatively large compartment for receiving visual elements and the second storage compartment comprises a relatively small compartment for receiving audio elements.

12. The apparatus of claim 1 in which the appendages include a head secured to the body, and another storage compartment is disposed in the head.

13. The apparatus of claim 1 in which the body means includes a body and an appendage is secured to the body, and a further storage compartment is secured to the appendage.

14. Apparatus for storing education element, comprising, in combination:

stuffed animal means, including a body and appendages extending outwardly from the body;

primary storage compartment means in the stuffed animal means including a first storage compartment for receiving a book; and cover means for covering the primary storage compartment means, including a flap covering the first storage compartment and secured to the book whereby opening the flap also opens the book.

15. The apparatus of claim 14 in which the primary storage compartment means includes a second storage compartment in the body.

16. The apparatus of claim 14 in which the primary storage compartment means further includes a second storage compartment in an appendage.

17. The apparatus of claim 14 which includes secondary storage compartments means secured to an appendage.

18. The apparatus of claim 17 in which the secondary storage compartment means is removably secured to the appendage.

* * * * *